United States Patent
Dhurjati et al.

(10) Patent No.: US 9,201,659 B2
(45) Date of Patent: Dec. 1, 2015

(54) EFFICIENT DIRECTED ACYCLIC GRAPH PATTERN MATCHING TO ENABLE CODE PARTITIONING AND EXECUTION ON HETEROGENEOUS PROCESSOR CORES

(71) Applicant: QUALCOMM Incorporated, San Diego, CA (US)

(72) Inventors: Dinakar Dhurjati, Santa Clara, CA (US); Minjang Kim, San Jose, CA (US); Christopher A. Vick, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 13/969,735

(22) Filed: Aug. 19, 2013

(65) Prior Publication Data

US 2015/0052331 A1    Feb. 19, 2015

(51) Int. Cl.
  *G06F 9/45*    (2006.01)
  *G06F 9/44*    (2006.01)
  *G06F 9/38*    (2006.01)

(52) U.S. Cl.
  CPC ............... *G06F 9/3877* (2013.01); *G06F 8/35* (2013.01); *G06F 8/44* (2013.01); *G06F 8/451* (2013.01); *G06F 9/3885* (2013.01)

(58) Field of Classification Search
  None
  See application file for complete search history.

(56) References Cited

U.S. PATENT DOCUMENTS

| | | | | |
|---|---|---|---|---|
| 5,202,975 A | * | 4/1993 | Rasbold et al. | 717/151 |
| 5,613,117 A | * | 3/1997 | Davidson et al. | 717/144 |
| 5,836,014 A | * | 11/1998 | Faiman, Jr. | 717/156 |
| 6,292,938 B1 | * | 9/2001 | Sarkar et al. | 717/138 |
| 9,098,309 B2 | | 8/2015 | Vick et al. | |
| 2004/0025151 A1 | * | 2/2004 | Ku | 717/159 |
| 2005/0039167 A1 | * | 2/2005 | Fernandes et al. | 717/116 |
| 2007/0174828 A1 | | 7/2007 | O'Brien et al. | |
| 2010/0156888 A1 | * | 6/2010 | Luk et al. | 345/418 |
| 2010/0333075 A1 | | 12/2010 | Asai et al. | |

(Continued)

OTHER PUBLICATIONS

Duala-Ekoko E., et al, "Clone Region Descriptors: Representing and Tracking Duplication in Source Code," ACM Transactions on Software Engineering and Methodology, Jun. 2010, vol. 20 (1), Article 3, 31 Pages.

(Continued)

*Primary Examiner* — Qing Wu
*Assistant Examiner* — Bruce S Ashley
(74) *Attorney, Agent, or Firm* — The Marbury Law Group, PLLC (57) ABSTRACT

Methods, devices, and systems for automatically determining how an application program may be partitioned and offloaded for execution by a general purpose applications processor and an auxiliary processor (e.g., a DSP, GPU, etc.) within a mobile device. The mobile device may determine the portions of the application code that are best suited for execution on the auxiliary processor based on pattern-matching of directed acyclic graphs (DAGS). In particular, the mobile device may identify one or more patterns in the code, particularly in a data flow graph of the code, comparing each identified code pattern to predefined graph patterns known to have a certain benefit when executed on the auxiliary processor (e.g., a DSP). The mobile device may determine the costs and/or benefits of executing the portions of code on the auxiliary processor, and may offload portions that have low costs and/or high benefits related to the auxiliary processor.

24 Claims, 6 Drawing Sheets

(56) References Cited

U.S. PATENT DOCUMENTS

2011/0231469 A1 9/2011 Wolman et al.
2013/0055224 A1 2/2013 Ravi et al.

OTHER PUBLICATIONS

Grewe D., et al., "A Static Task Partitioning Approach for Heterogeneous Systems Using OpenCL," in proceedings of the 20th international conference on compiler construction: part of the joint European conferences on theory and practice of software (CC'11/ETAPS'11), 2011, 20 pages.

Kawahito M., et al., "A New Idiom Recognition Framework for Exploiting Hardware-Assist Instructions," in proceedings of the 12th international conference on Architectural support for programming languages and operating systems (ASPLOS XII), Oct. 21-25 2006, pp. 382-393.

Koes D.R., et al., "Near-Optimal Instruction Selection on DAGs," in proceedings of the 6th annual IEEE/ACM international symposium on code generation and optimization (CGO '08), Apr. 5-10 2008, 10 Pages.

Ebner D., et al., "Generalized Instruction Selection Using SSA-Graphs", Proceedings of the 2008 ACM SIGPLAN-SIGBED Conference on Languages, Compilers, and Tools for Embedded Systems, LCTES '08, Jan. 1, 2008, p. 31, XP055150350, New York, New York, USA DOI: 10.1145/1375657.1375663 ISBN: 978-1-60-558104-0.

International Search Report and Written Opinion—PCT/US2014/050576—ISA/EPO—Nov. 12, 2014.

M. Anton Ertl: "Optimal code selection in DAGs", Proceedings of the 26th ACM SIGPLAN-SIGACT Symposium on Principles of Programming Languages, POPL '99, Jan. 1, 1999, pp. 242-249, XP055150255, New York, New York, USA DOI: 10.1145/292540.292562 ISBN: 978-1-58-113095-9.

\* cited by examiner

EFFICIENT DIRECTED ACYCLIC GRAPH PATTERN MATCHING TO ENABLE CODE PARTITIONING AND EXECUTION ON HETEROGENEOUS PROCESSOR CORES

BACKGROUND

Mobile electronic devices (e.g., cellular phones, watches, headphones, remote controls, etc.) have become more complex than ever, and now commonly include multiple processors, system-on-chips (SoCs), and other resources that allow mobile device users to execute complex and power-intensive software applications (e.g., video streaming, video processing, etc.) on their mobile devices. With this rise in complexity and power consumption, new and improved processing technologies that better utilize the mobile device's resources and capabilities are beginning to emerge.

These emerging technologies include systems capable of compiling code that is designed for execution on a general purpose applications processor so that the code is suitable for execution on an auxiliary processor, such as a digital signal processor (or DSP). In particular, an application program may be partitioned into units or chunks, and the units/chunks may be distributed to different processing components based on the identified efficiencies/capabilities of the processing components (e.g., a DSP, graphics processing unit or GPU, etc.). This allows the main or central processing unit (CPU) or applications processor to offload some of its operations to an auxiliary processor to conserve power and/or improve performance.

However, determining how the application program is to be partitioned, and which partitions are best suited for execution on an auxiliary processor is often a difficult design task. That is, offloading operations to an auxiliary processor may improve the performance and power consumption characteristic of the mobile device so long as there is an efficient way to recognize and partition a given code segment into components that are well suited for execution in different types of cores or processing units.

Existing technologies may utilize different techniques for identifying and/or processing code. Some techniques may utilize automatic code partitioning and may represent application code by program dependence graphs for partitioning the code using inherent parallelism and known communication costs. These techniques do not utilize predefined patterns that may be known to benefit particular processing units, such as a digital signal processor (DSP). Other techniques may detect idioms (or known/predefined sets of instructions) within code (or binaries) and replace the idioms with hardware-assist instruction (i.e., complex instruction set computing or "CISC" instructions). These techniques typically may only handle a limited granularity (mostly a straight line of instruction) and a simple pattern, such as either exact patterns or a limited degree-of-freedom. Additionally, certain techniques exist for finding duplicate code and detecting clones using high-level source code. Further, graph pattern matching has been used in database systems.

Other techniques exist that employ instruction selection algorithms that utilize tree pattern matching to adjust code to include low-cost instructions. In particular, bottom-up rewrite systems (or BURS) algorithms may be used to determine best instruction sets for input codes (e.g., applications, routines, etc.) by iteratively matching various subtrees within input trees related to the input codes in order to find best cost sets of instructions (i.e., combination of instructions that cover the entire trees and yet provide the lowest costs/highest benefits). Based on the pattern matching, new, improved instruction sets may be generated for execution on computing devices.

However, the known techniques may not be suitable when offloading portions of complex code using graph-based representations. In other words, existing technologies may not use compiler back-end solutions that match directed acyclic representations of code to identify best offloading for heterogeneous multicore or distributed systems.

SUMMARY

In various aspects, a computing device may perform a method for offloading portions of an input code from a CPU or applications processor (a "first processor") to an auxiliary processor when the portions may be automatically determined to be well-suited for the auxiliary processor. An aspect method may include generating a graph-based intermediate representation of the input code in which the graph-based intermediate representation of the input code may be a directed acyclic graph (DAG), comparing each node or combination of nodes to one or more patterns in a predefined grammar in which each pattern may be a DAG pattern and may be associated with a cost metric, identifying a set of patterns that partially cover the graph-based intermediate representation of the input code based on the comparisons, and offloading from the first processor to the auxiliary processor segments of the input code associated with a combination of grammar patterns of the identified set of patterns having a best cumulative effect. In an aspect, comparing each node or combination of nodes to one or more patterns in a predefined grammar may include comparing the each node or the combination of nodes to pattern information stored in a heuristic table. In an aspect, the computing device may include a system-on-chip. In an aspect, the auxiliary processor may be one of a digital signal processor (DSP) and a graphics processing unit (GPU). In an aspect, the patterns in the predefined grammar may be known to be well suited for the auxiliary processor. In an aspect, the best cumulative effect may be one of a lowest cumulative cost and a highest cumulative benefit. In an aspect, the method may further include generating information for presentation to a developer that indicates segments of the input code that can be configured for the auxiliary processor based on the comparisons of the each node or the combination of nodes to the one or more patterns in the predefined grammar.

In another aspect, a computing device configured to offload portions of an input code when the portions may be automatically determined to be well-suited for an auxiliary processor may include means for performing the functions of the aspect methods described above.

In another aspect, a computing device configured to offload portions of an input code when the portions may be automatically determined to be well-suited for an auxiliary processor may include a memory, an auxiliary processor, and a processor coupled to the memory and the auxiliary processor, in which the processor may be configured with processor-executable instructions to perform operations of the aspect methods described above.

In another aspect, a non-transitory processor-readable storage medium having stored thereon processor-executable software instructions configured to cause a processor to perform operations for a computing device to offload portions of an input code when the portions may be automatically determined to be well-suited for an auxiliary processor, in which the stored operations include the operations of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "computing device" are used herein to refer to any one or all of cellular telephones, smart-phones (e.g., iPhone®), web-pads, tablet computers, Internet enabled cellular telephones, WiFi enabled electronic devices, personal data assistants (PDA's), laptop computers, personal computers, and similar electronic devices equipped with at least an application processor (or general processor) and an auxiliary processor (e.g., a digital signal processor, a coprocessor, another processor on a system-on-chip, etc.).

The various aspects provide methods for offloading portions of an input code for execution from a CPU or applications processor (referred to generally herein as a "first processor") to an auxiliary processor within a computing device based on pattern matching directed acyclic graphs (DAGs) representing the code. The computing device may perform the aspect methods to automatically and efficiently detect patterns of interest in the code that are known to be good for processing with a particular type of core (e.g., a DSP, GPU, etc.). The computing device may automatically recognize a set of DAG patterns that partially cover an input data flow graph of the input code, and may offload portions of the code associated with the least cost when performed on the auxiliary processor or otherwise provide the highest benefit from offloading. The aspect methods may be implemented in computing devices that work with typical input code (e.g., typical Java language source code), and thus may not require any special pre-processing or formatting by code developers (e.g., manually added indicators, API calls, predefined code formatting, etc.). Computing devices implementing the various aspects may automatically identify portions of code that are be well-suited for offloading to an auxiliary processor, and use conventional mechanisms for transmitting, transferring, or otherwise enacting offloading of such identified well-suited code.

The various aspects methods utilize pattern matching algorithms that compare the nodes of the DAGs to predefined grammar patterns that also include DAGs. The various aspect methods may be performed by a computing device to determine intermediate representations (IR) of code and generate DAG representations that can be processed through a pattern matching algorithm. Such algorithms may attempt to match patterns in the DAG representation of the code to DAG patterns stored in memory (referred to as a "grammar") that are known to be well-suited for executing on the auxiliary processor. DAG representations may be trimmed so that there are no cycles. For example, DAG patterns in the grammar may correspond to certain simple functions that efficiently execute on a digital signal processor (DSP). The computing device may identify grammar patterns that cover an entire DAG, such as the DAG representing a code loop or method in the input code, and may identify the best matching patterns based on costs (or benefits) associated with the grammar patterns. For example, a particular DAG of the input code may be matched to several patterns within the grammar; however, one of the matching patterns may have a relatively low cost to perform the associated code on the auxiliary processor. The computing device may perform pattern-matching such that the plurality of known DAG patterns in the predefined grammar are detected within the input IR code at once. In various aspects, the operations of the computing device may be performed at runtime, for example in combination with a just-in-time (JIT) compiler. In other words, with a graph of nodes and edges associated with an input code (i.e., a DAG where edge direction and node type that cannot be separated), the computing device may perform pattern-matching operations to find an exact match of nodes/edges in the graph to a pattern within a grammar. The matching pattern itself may be flexible in the sense of either node type (e.g., type A or type B at a location in the pattern). The exact match is for a complete pattern over a subgraph of the input code. So, the computing device may find patterns from the grammar that each partially cover the input, but that completely cover a subgraph of the input.

In an aspect, for each node in a DAG of the input code, the computing device may compute a table of all possible "types" that match the node (as may be similarly done in BURS solutions) along with the matching rule/pattern of the predefined grammar. The computing device may also automatically identify and/or store the cumulative cost for the pattern rooted at each node (as may be similarly done in BURS solutions). The computing device may also perform a bottom-up pass from the rooted DAG (as may be similarly done in BURS solutions). However, when the computing device matches a node to a known pattern within the predefined grammar, the computing device may use the previously computed result for that pattern without re-computing the table. Additionally, whenever a node is matched with a particular pattern in the grammar, the computing device may confirm whether connections between nodes in the DAGs (or sharing via directed edges) are similarly represented in the matching rules or patterns. For example, when a node corresponding to a function (e.g., a 'store' function) matches a grammar pattern or rule, the computing device may check for sharing (or connections between other nodes) to determine whether the matching grammar pattern indicates similar relationships between the pattern nodes (e.g., whether "load" and "store" operations are both reading and writing to the same array data structure respectively, etc.). The aspect methods may be performed by the computing device to match DAG patterns in intermediate representations of input code and predefined grammars with the same time complexity as performing regular tree pattern-matching.

In an aspect, a computing device may utilize pattern specification language (PSL) or PSL techniques suitable for expressing patterns. For example, the computing device may use PSL to define patterns within a grammar that may be compared to code representations. Further, the computing device may automatically generate code using PSL based on the data flow graph of input code. By using PSL, the computing device may be enabled to express both exact patterns and 'relaxed' patterns in input code. For example, a relaxed pattern may be a pattern that includes some generic arithmetic computation without actually specifying what that arithmetic computation should be. In other words, using PSL may enable associative or commutative pattern-matching by the computing device. In an aspect, PSL may be used to also express "a loop that contains affined array accesses" with a relaxed pattern.

Currently, many software developers may not have an understanding of the capabilities of different processing units or cores within a computing device that executes their applications, and thus may not know whether portions of their applications may be targeted or otherwise designed to effectively use these different cores. In an aspect, a computing device may be configured to enable a developer toolkit that assists such software developers in identifying portions (or segments) of code in their applications (or source code) that may be optimized or configured for particular auxiliary processors or cores, such as a DSP or GPU. Using operations similar to those described below for identifying code portions to be automatically offloaded, the computing device may be configured to process and evaluate code to identify portions of the code that correspond to predefined DAG patterns within grammars, and generate helpful information or hints that indicate for which cores certain portions of the evaluated code may be well-suited. The computing device may also be configured to present the generated helpful information (e.g., render a presentation of helpful information to a software developer). Such helpful information may include suggestions that indicate the portions of code developers may target for use with a compiler and/or hand configuration operations to increase overall code efficiency when executed on the computing device. Thus, with this technology, software developers may not need to understand particular processor details, but instead may simply write code in their favorite high level language, and the computing device may identify and present information indicating the right processor for use with various portions of that code.

In the following figures and descriptions related to FIGS. 3 and 5, example grammars (with rules and costs) and input structures (e.g., input DAGs) are depicted and described to illustrate various aspect methods and implementations. Such examples, as well as any particular values, operations, functions, or structures included within, are merely for demonstrative purposes and are not intended to limit the scope of the novel aspect methods and devices recited in the claims. In particular, specific example values indicated in such illustrations, such as numeric "costs" associated with particular functions, rules, or structures, may be arbitrary and provided merely for illustration purposes, and may not have any relation to actual costs or benefits of actual functions or structures.

Figure 1:
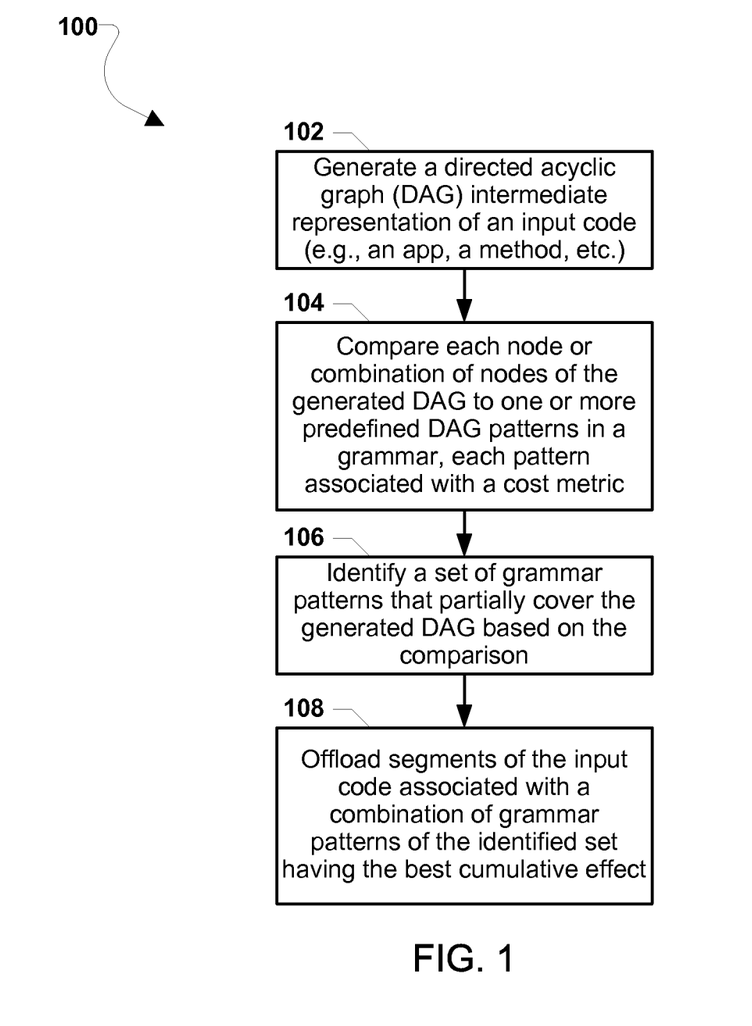
FIG. 1 is a process flow diagram illustrating an aspect method for offloading code for execution from a CPU or applications processor to an auxiliary processor based on directed acyclic graph (DAG) pattern matching.

FIG. 1 illustrates an aspect method 100 for a computing device to select code for offloading from a CPU or applications processor to an auxiliary processor (e.g., a DSP, GPU, etc.) based on DAG pattern matching. The aspect method 100 may be performed by a computing device (e.g., a laptop, smartphone, etc.) to perform pattern matching against a known grammar that includes DAG patterns (i.e., a library of known DAG patterns and associated costs and/or benefits).

Various BURS algorithms may find best sets of instructions for accomplishing the functionality of code segments by combining instructions and comparing cost models associated with each instruction/node with the cost of each possible combination of instructions. As such, BURS instruction selection methods, when applied to DAGs, would require exploring the possibility of creating copies of original input code to find best sets of instructions to accomplish the objectives of the original input code, and thus are solving an "np-complete" problem. The method 100 and other aspect methods described below do not generate new instructions (or alternate instructions) for an input code, but instead automatically identify multiple patterns for each node or combination of nodes in a DAG that are well-suited for offloading a CPU or applications processor to an auxiliary processor, such as a DSP. In other words, the aspect methods may be performed by a computing device as a non-exponential algorithm to identify a plurality of patterns and select the most cost effective code for offloading, thus solving a much simpler problem than BURS algorithms.

In block 102, the computing device may generate a directed acyclic graph (DAG) intermediate representation of an input code. For example, a DAG may be generated based on source code of a method, a set of methods, or an entire application. Such graph-based intermediate representations may be known as a data flow graphs. In general, intermediate representations of code may be generated by parsing the input code (e.g., a software application program or portions of a software program) and determining a graphical or symbolic mapping of the structure of the code. For example, intermediate representations, such as DAGs of an input code for a certain method, may indicate the syntax and other functional or operational elements within the code. Intermediate representations may include extra information, such as annotations, which may be used by a dynamic or just-in-time (JIT) compiler to analyze and configure the program.

The DAG intermediate representation may include nodes (sometimes referred to as vertices) with unidirectional connections, which may be referred to as edges. Such connections between DAG nodes may represent logical relationships between the nodes. For example, a connection between a leaf node and a root note may indicate the leaf node is an operand of a function. Further, DAGs may not include cycles, such as representations of code loops. In particular, the generated DAG may be trimmed or adjusted so that no cycles exist in the intermediate representation, regardless of any loops or cycles inherent within the input code. In various aspects, a compiler routine, module, instructions, or other component may be utilized by the computing device to convert the input code (e.g., source code, binary code, etc.) of an application into a DAG structure of connected leaves and/or nodes.

It should be noted that DAGs are not the same as input trees (or syntax input trees), as may be used in BURS algorithms. For example, in various BURS implementations, an input code may be converted to an expression input tree that includes various leaf nodes and subtrees and that may be traversed from any leaf node to a root node in a single direction. The aspect methods may generate DAGs that include more information regarding the connections between nodes than trees. DAG nodes may be connected in various directions and/or with multiple connections, thus requiring additional operations for evaluating nodes and pattern matching, as described below.

In block 104, the computing device may compare each node or combination of nodes of the generated DAG to one or more predefined DAG patterns in a grammar, each pattern associated with a cost metric. In other words, the computing device may traverse the nodes of the generated DAG to detect matches with the grammar patterns. The computing device may visit each node of the generated DAG in a bottoms-up fashion, essentially visiting the children (or leaf nodes) of a node before visiting the node itself. When the computing device visits a node, it may search for all the DAG patterns (or sub patterns) matching that node, and update a table of all possible types (e.g., "non-terminals" in the grammar) to which the node can be matched with their enabling pattern rule identifier and associated cost (e.g., the cost of the DAG pattern rooted at that node). At the root of the generated DAG, the computing device may find a low cost way of covering each node (or combination of nodes) of the generated DAG with pattern rules from the grammar.

In various aspects, the grammar may simply be a data structure that stores the predefined DAG patterns along with related information. For example, the grammar may be a listing of DAG patterns (or structures) associated with instructions known to perform in certain ways, efficiencies, or costs on particular architectures, devices, operating systems, etc. Unlike other techniques, the aspect methods may store within the grammar a plurality of predefined DAG patterns, not trees. For example, the stored predefined patterns may be expressed as a set of rooted DAGs, each of which may include a cost and/or benefit metric for the associated pattern. In various aspects, the grammar may include DAG patterns that are known to be well-suited for a particular core, such as a DSP or a GPU within the mobile device. Non-limiting illustrations of such aspect grammars are described below.

The operations in block 104 may automatically determine well-suited code for offloading without requiring any developer to manually indicate such well-suited code. In various aspects, the comparisons of the operations in block 104 may include determining whether grammar patterns match the DAG nodes based on node characteristics or type (e.g., leaf, corresponds to a particular operations, etc.) and node configurations, connections, or arrangements (e.g., a directed connection between particular nodes). When making the comparisons, the computing device may determine orientations, connections, and dependencies of the nodes within the DAG. For example, the computing device may determine that a subgroup of nodes within the generated DAG includes two register leaves (e.g., integer values stored within registers) and a root node that corresponds to a certain mathematical operation (e.g., add, multiply, etc.). In an aspect, the comparison of the nodes to the grammar may include comparing each node or combination of nodes of the generated DAG to pattern information stored in a heuristic table.

In block 106, the computing device may identify a set of grammar patterns that partially cover the generated DAG based on the comparisons. In other words, based on the comparisons in the operations in block 104, the computing device may recognize various DAG patterns defined in the grammar as related or linked to all nodes of the DAG (and thus all elements of the input code). For example, the set of identified grammar patterns may include a grammar pattern that is associated with each variable and function represented in the generated DAG. In various aspects, the identified set may include more than one grammar pattern for particular elements of the generated DAG (e.g., a plurality of stored patterns with associated costs/benefits may match a particular node or combination of nodes of the generated DAG).

In block 108, the computing device may offload segments of the input code associated with a combination of grammar patterns of the identified set of patterns having the best identified cumulative effect. This may be accomplished by determining the costs and benefits of the identified set of grammar patterns and offloading a segment of code associated with an identified combination of patterns having the lowest cost from a CPU or applications processor to an auxiliary processor (e.g., a DSP, GPU, etc.). In various aspects, the segments may be offloaded when the lowest cumulative cost (or highest/greatest cumulative benefit) exceeds a predefined threshold value. For example, the input code (or a segment of the input code) may be offloaded to a DSP when the identified set of grammar patterns is associated with combined costs that do not exceed a maximum cost threshold value for beneficial offloading from a CPU or applications processor to the DSP.

Figure 2:
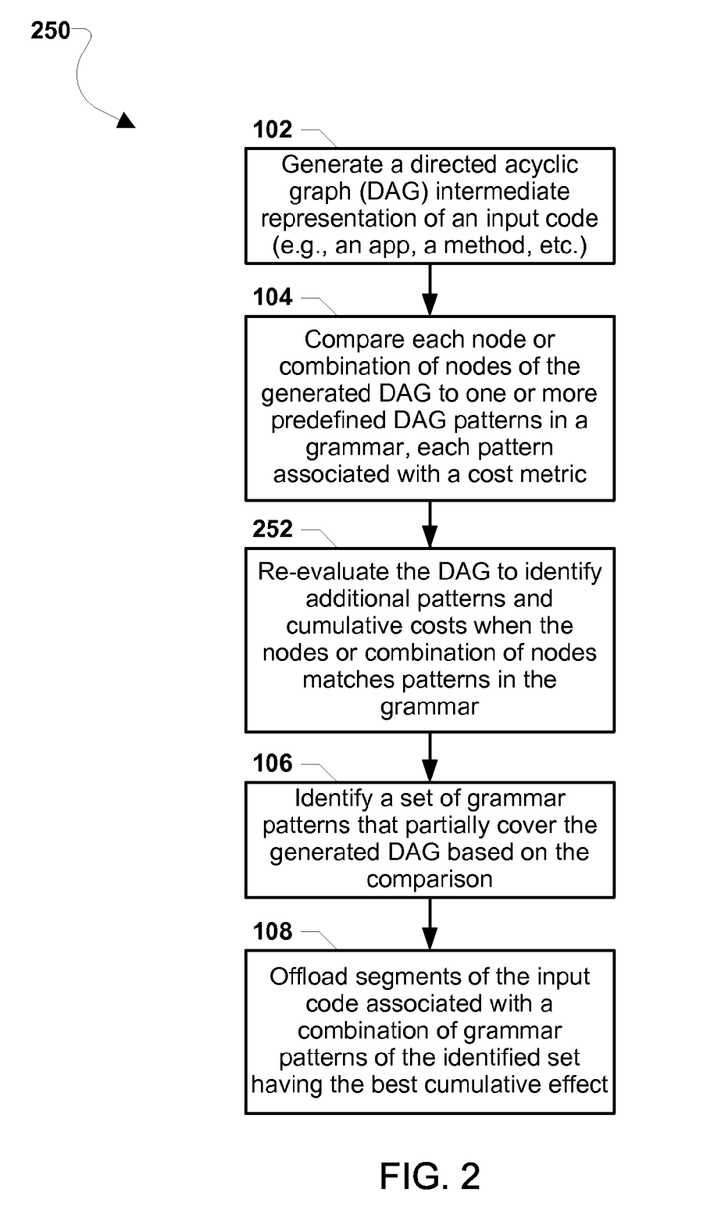
FIG. 2 is a process flow diagram illustrating another aspect method for offloading code for execution from a CPU or applications processor to an auxiliary processor based on directed acyclic graph (DAG) pattern matching.

FIG. 2 illustrates an aspect method 250 for a computing device to select code for offloading to an auxiliary processor (e.g., a DSP, GPU, etc.) based on DAG pattern matching. The method 250 is similar to the method 100 described above, except that the method 250 includes explicit operations for re-evaluating patterns in order to confirm matching patterns include the same connections between nodes as defined within the DAG. In block 102, the computing device may generate a directed acyclic graph (DAG) intermediate representation of an input code as described above. In block 104, the computing device may compare each node or combination of nodes of the generated DAG to one or more predefined DAG patterns in a grammar, each pattern associated with a cost metric. In block 252, the computing device may re-evaluate the DAG to identify additional patterns and cumulative costs when the nodes or combination of nodes matches patterns in the grammar. In other words, as the DAG includes directed edges or connections between nodes, the computing device may be configured to perform a confirmation evaluation pass (e.g., re-traverse the DAG) in order to ensure any matched patterns of the grammar match both the configuration of nodes within the generated DAG and any direction of edges associated with the nodes. In block 106, the computing device may identify a set of grammar patterns that partially cover the generated DAG based on the comparison. For example, based on the traversal and re-traversal of the DAG, the computing device may identify a set of grammar patterns that is confirmed to match the configuration, node type, and edges of the DAG. In block 108, the computing device may offload segments of the input code associated with a combination of grammar patterns of the identified set of patterns having the best cumulative effect.

Figure 3:
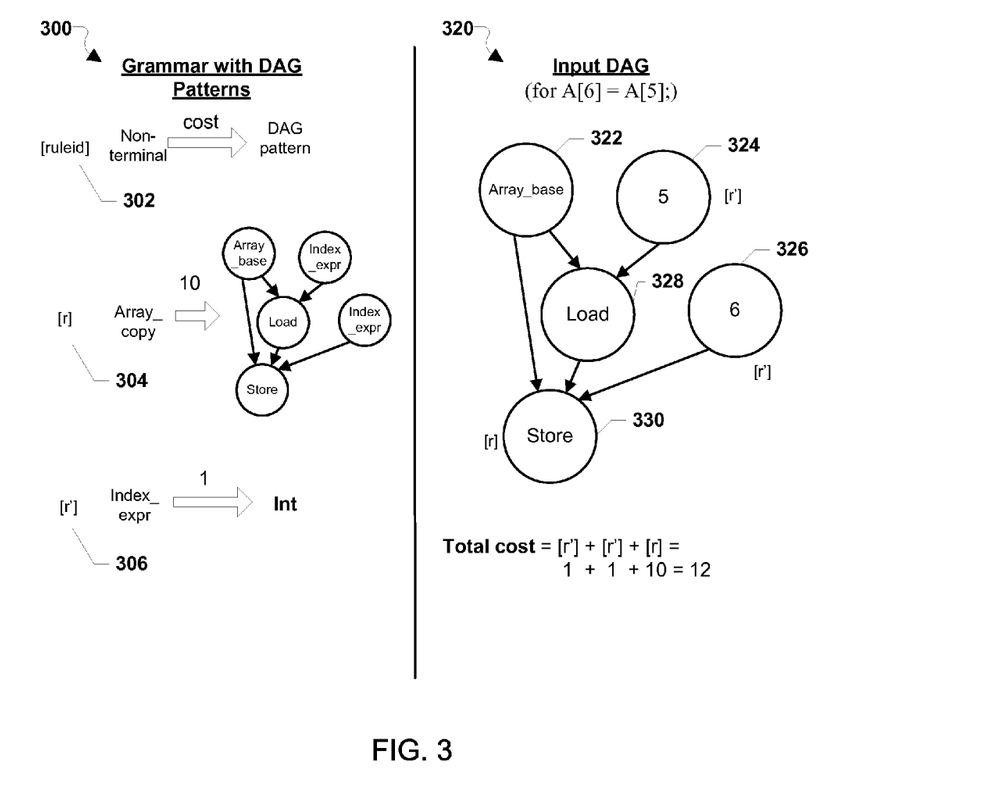
FIG. 3 is a diagram illustrating an example grammar and code input DAG suitable for use with various aspects.

FIG. 3 illustrates an exemplary grammar 300 and an input DAG 320 related to an input code suitable for use with various aspects. The grammar 300 may include rules 304-306 that each include a rule identifier (e.g., "[r]", "[r']", etc.), a non-terminal symbol, a cost (or cost metric) associated with the rule, and a DAG pattern associated with the rule (e.g., a set of nodes forming a DAG pattern or a terminal node, such as an integer). Costs and/or benefits indicated by rules may be general representations of the expense, toll, time, or value to the computing device and/or the auxiliary processor related to executing operations associated with DAG patterns of the grammar, and may be an approximation of processing cycles, resources utilized, or other metrics for quantifying its execution. For example, the costs of the rules may represent a number of processor cycles, time, battery life, or other resources required to perform the instructions associated with the individual rules. The template item 302 may show the structure of rules within the grammar 300. In various aspects, a non-terminal symbol may include a term, symbol, or other information that may be associated with a structure or terminal value, such as a register or the name of function or expression.

In general, devices may not be required to expend any resources in order to access or process a value already stored in a register. Accordingly, various aspect grammars may include rules that reference registers and that may or may not be associated with a zero (0) cost (i.e., such grammar rules may have no cost). In various aspects, DAG leaf nodes may typically be terminals (e.g., integers) or non-terminals.

Each of the rules 304-306 may be associated with methods or other operations that may be well-suited for performing on an auxiliary processor, such as a DSP. For example, a first rule 304 (i.e., "[r]" rule) may be associated with an "array_copy" operation that has a certain cost when executed on a DSP. Such an operation may be a function or routine for copying a value, such as an integer, stored at a particular index within an array data structure into another index of that array data structure. A second rule 306 (i.e., "[r']" rule) may be associated with an index expression, such as an integer index value used in combination with an array data structure, and may have another associated cost.

As described above, input code may be software instructions, such as source code or binary code, that includes various functionalities. For example, input code may include mathematical operations, such as an operation to add two values stored in registers for storage in another register. Regarding FIG. 3, an exemplary input code for use with the grammar 300 may be code that functions to copy an element of an array from one index to another (i.e., an array copy function). For example, the input code may be an operation represented by "A[6]=A[5]," where 'A' may be an array variable name. The pattern for recognizing this array assignment function may not be expressed as a simple tree, as particular elements of the input code may be connected to more than one other node (e.g., a shared node). Thus, the input code may be represented by an input DAG. In an aspect, a parser function may convert the "A[6]=A[5]" operation into the following set of operations: array_copy=store(array_base, index_expr, load(array_base, index_expr)), where 'array_copy' is a known function, 'store' is a known function that stores or saves a value in a particular location (e.g., a memory location associated with a certain array index), 'array_base' represents a memory location related to an array data structure, 'index_expr' is an indication that an array index is addressed, and 'load' is a known function that may make a stored value accessible, such as by placing a stored value in a register. A computing device may convert such an exemplary input code into the input DAG 320.

The input DAG 320 may include nodes 322-330 that represent the set of operations and elements recognized by a parser as needed to complete the input code. In particular, the input DAG 320 may include a first node 324 representing a first 'index_expr' element (e.g., the array index '5'), a second node 326 representing a second 'index_expr' element (e.g., the array index '6'), a third node 322 representing an 'array_ base' element (e.g., the location of the 'A' array in the computing device memory), a fourth node 328 representing the 'load' function, and a fifth node 330 representing the 'store' function. The third node 322 may be a shared node, as it has connections (or edges) to both the fourth node 328 and the fifth node 330. In other words, for the exemplary input code of "A[6]=A[5]," the individual 'load' and 'store' functions may both be required to access the array 'A' for loading and storing values, respectively.

The input DAG 320 may be compared to the grammar 300, as described above. In particular, the computing device may identify that the first node 324 matches the second rule 306 (i.e., "[r']"), the second node 326 also matches the second rule 306 (i.e., "[r']"), and the entire pattern of the input DAG (i.e., all the nodes 322-330) matches the first rule 304 (i.e., "[r]"). In various aspects, the matching of the input DAG 320 elements to the grammar 300 may include matching node types and also connections between nodes (i.e., confirm correct sharing between elements). Based on these matches, the computing device may determine the cumulative effect of the elements of the input DAG 320 and therefore the cost or benefit of the input code executing on the auxiliary processor. For non-limiting illustration purposes based on the arbitrary cost values of FIG. 3: the computing device may determine that the two nodes that match the second rule 306 each correspond to a cost of one (1), and the match of the entire input DAG 320 corresponds to a cost of ten (10), for a total cost of twelve (12).

Figure 4:
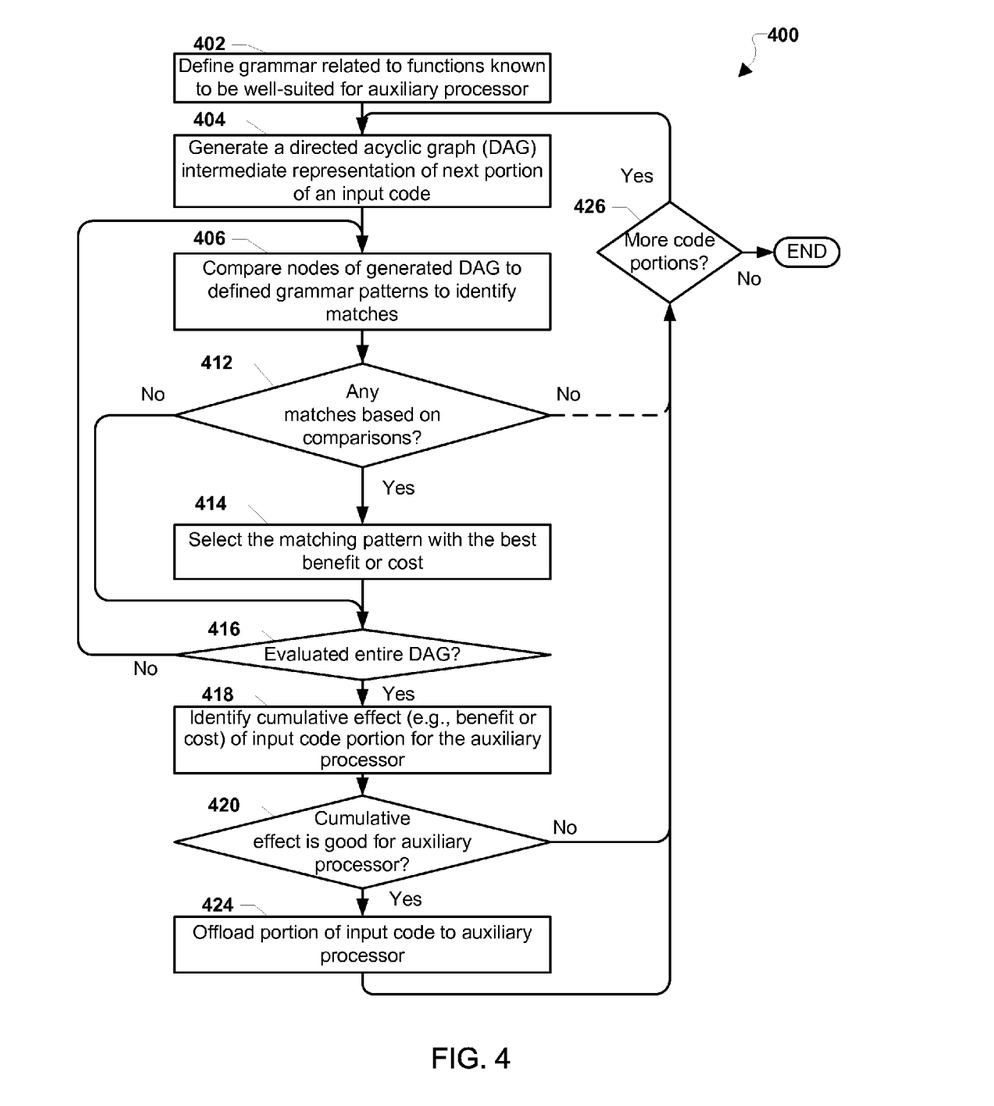
FIG. 4 is a process flow diagram illustrating an aspect method for offloading code portions for execution from a CPU or applications processor to an auxiliary processor based on DAG pattern matching.

FIG. 4 illustrates an aspect method 400 for a computing device to select code for offloading from a CPU or applications processor to an auxiliary processor based on DAG pattern matching. The method 400 may be considered a detailed implementation of the aspect methods described above with reference to FIGS. 1-2.

In block 402, the computing device may define a grammar related to functions known to be well-suited for an auxiliary processer (e.g., a DSP, GPU, etc.). The grammar may include a stored set, table, or database of rules that correspond to non-terminals, operands and/or DAG patterns with associated cost metrics. For example, the grammar may include a rule that includes a cost or benefit metric and associated DAG pattern related to a Fast Fourier Transform (FFT) function that is known to be well-suited for a DSP. Such a grammar may be predetermined and loaded or otherwise stored on the computing device.

In block 404, the computing device may generate a DAG intermediate representation of a next portion of an input code. For example, the computing device may generate a DAG for a method within an application. When the method 400 is executed for the first time (i.e., the first iteration), the next portion may be the first portion of code within the input code. In an aspect, the computing device may utilize a module, routine, software, or other instructions to partition the input code into methods or other blocks of operational code. Further, the computing device may perform operations to remove cycles from the generated DAG, for example, when the input code is a loop. In various aspects, the computing device may partition the input code so that the DAG represents the code of an operational loop (e.g., a 'for' loop, etc.). For example, the computing device may only perform the method 400 to determine whether loops in methods of the input code are well-suited for execution on the auxiliary processor.

In block 406, the computing device may compare nodes of the generated DAG to the defined grammar patterns to identify matches. For example, the computing device may compare input values of the generated DAG (e.g., integers, float values, etc.) that are stored in registers of the computing device to structures defined in rules of the grammar. The compared nodes may be a combination of the leaf nodes, root node, and other nodes within the generated DAG. In various aspects, the compared nodes for each loop of the method 400 may be a subset of the generated DAG, a predetermined number of nodes of the generated DAG, or a combination of nodes that are connected via edges (e.g., nodes related to a subroutine or subfunction represented within the generated DAG). For example, the nodes compared with the operations in block 406 may be a set of nodes of the generated DAG that correspond to a 'load' function or a 'store' function (e.g., a node representing an array, a node representing an index expression, and a 'load' function node.). Alternatively, the comparison may be done on a node-by-node basis (e.g., compare a leaf node to individual node patterns in the grammar, etc.).

Further, because DAGs utilize directed connections between nodes (e.g., directed edges between nodes), identifying matching patterns may only occur when the nodes of the generated DAG match patterns of the grammar that have both the same configuration of nodes (e.g., two leaf nodes of a certain type connected to another node of another type) and the same direction of edges between nodes. In other words, pattern matching may occur when both the node types and the connections of the generated DAG and grammar are the same. Accordingly, the computing device may also compare edge directions when a node in the generated DAG is shared (i.e., the node is an input to more than one node) to confirm any matching grammar pattern includes the same edge directions for corresponding nodes. For example, the computing device may determine whether a combination of nodes from the generated DAG and a matching pattern within the grammar share the same edge directions between the matching nodes. This may be considered re-traversing the generated DAG in relation to the compared nodes.

The operations in block 406 may be similar to the operations in blocks 104 and 252 described above with reference to FIGS. 1-2. For example, the computing device may identify whether any matches exist between the patterns of the defined grammar and the leaf nodes within the generated DAG (e.g., integer nodes, register nodes, etc.). Further, the operations in block 406 may not require any manual indications provided by code developers (i.e., the comparisons may be automatic).

In determination block 412, the computing device may determine whether there are any matches between the nodes of the generated DAG and the defined grammar patterns based on the comparisons. For example, the computing device may determine whether the leaf nodes of the generated DAG match any patterns/node types within rules of the grammar. As described above, the grammar may include a plurality of patterns (e.g., leaves and root nodes) that represent different configurations but that may still match a certain operation and/or various operations (e.g., shifts, loads, etc.) in the DAG. For example, the computing device may compare a DAG (or subset of a DAG) to the grammar and identify several DAG patterns within the grammar that match.

If there are no matches based on the comparisons (i.e., determination block 412="No"), the computing device may continue with the operations in determination block 416.

In an optional aspect, if there are no matches based on the comparisons (i.e., determination block 412="No"), the computing device may continue with the operations in determination block 426. In other words, when any node or combination of nodes cannot be matched to the patterns within the defined grammar, the computing device may determine the current portion of the input code may not be offloaded to the auxiliary processor and may continue with the next portion, if any.

However, if there is at least one match based on the comparisons (i.e., determination block 412="Yes"), in block 414 the computing device may select the matching pattern with the best benefit or cost. In other words, when the current node or subset of nodes of the generated DAG matches multiple DAG patterns within the grammar, the computing device may pick the matching grammar pattern with the lowest cost or highest benefit. For example, the computing device may compare the costs associated with the pattern matches and defined within the grammar, and may select the pattern with the lowest cost. Alternatively, based on the information within the defined grammar, the computing device may evaluate any benefits associated with the matching patterns and may select a pattern that has a benefit that outweighs the costs of any of the other matching patterns. For example, the computing device may select a matching pattern that is known to be particularly well-suited for the auxiliary processor, such as the pattern has a very low cost or some added benefit due to the configuration of the nodes of the DAG. As described above, the cost or benefit for a pattern (or rule) within the grammar may be stored in relation to each pattern, such as within a relational database or other data structure. In an aspect, the computing device may store information indicating the selected matching pattern with the best effect, such as by storing in a data structure the identification of the matching pattern, the cost of the instruction, or other identifying information that may be accessed and used in the operations in block 418.

In determination block 416, the computing device may determine whether the entire generated DAG has been evaluated. For example, when only a subset of the nodes of the generated DAG have been compared to the grammar with the operations in block 406, the computing device may continue to traverse the generated DAG until the entire portion of code has been evaluated. In various aspects, the root node of the generated DAG may represent the final or terminal operation, step, instruction, or connector within the input code used to generate the DAG.

If the entire generated DAG has not been evaluated (i.e., determination block 416="No"), the computing device may continue evaluating the rest of the portion of code by my comparing more nodes of the generated DAG to the grammar patterns in block 406. In this way, the computing device may iteratively evaluate all of the nodes of the generated DAG for the portion of the input code.

When the entire generated DAG has been evaluated (i.e., determination block 416="Yes"), in block 418 the computing device may identify a cumulative effect (e.g., benefit or cost) of the input code portion for the auxiliary processor. For example, the computing device may determine a combined cost based on the cost metrics of the individual patterns of the grammar matched to the DAG. The computing device may identify the cumulative effect by adding the costs and/or benefits identified for each individual portion within the generated DAG and the operations in block 418 may include accessing and combining data stored during the operations of block 414. In determination block 420, the computing device may determine whether the cumulative effect is good for the auxiliary processor (e.g., a DSP, GPU, etc.). In an aspect, the computing device may compare the cumulative benefit or cost as identified in block 418 to a predefined threshold value stored in the computing device. In another aspect, the computing device may determine that the portion of the input code is good for the auxiliary processor when the generated DAG is fully covered. In other words, the computing device may determine that the related code portion is suitable for offloading when all nodes or combinations of nodes within the current DAG are matched to patterns within the defined grammar. If the cumulative effect is good for the auxiliary processor (i.e., determination block 420="Yes"), in block 424 the computing device may offload the portion of the input code from a CPU or applications processor to the auxiliary processor.

If the computing device determines that the cumulative effect is not good for the auxiliary processor (i.e., determination block 420="No"), or if the portion is offloaded, the computing device may determine whether there are more code portions to evaluate in determination block 426. For example, when the computing device is configured to parse the input code on a method-by-method basis, the computing device may iteratively perform the operations in blocks 404-424 until the entirety of the input code has been evaluated. If there are more portions of the input code (i.e., determination block 426="Yes"), the computing device may continue with the operations in block 404. When there are no more portions of the input code (i.e., determination block 426="No"), the method 400 may end.

Figure 5:
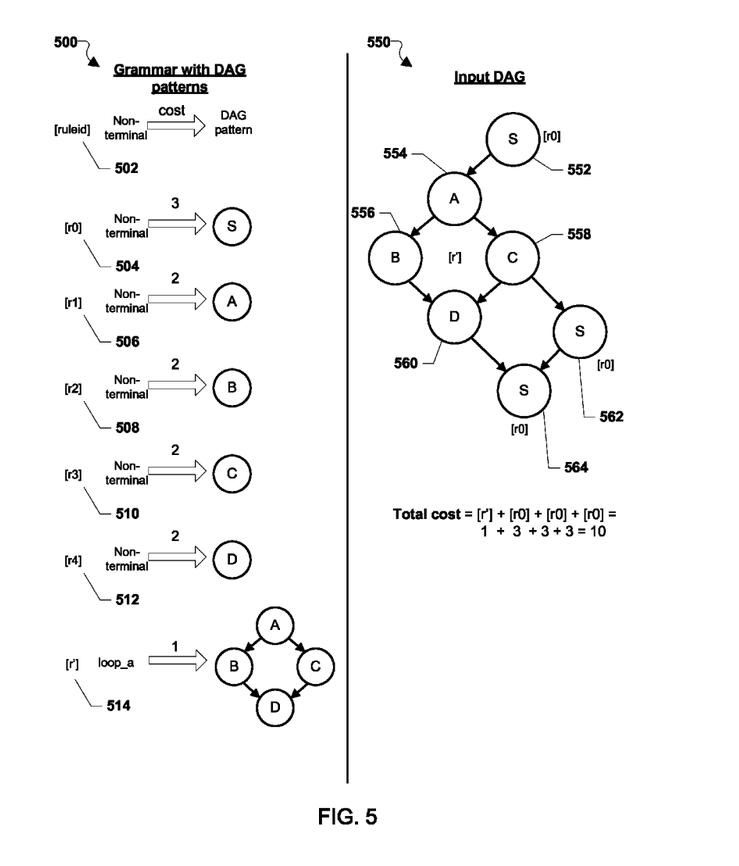
FIG. 5 is a diagram illustrating an example grammar and a code input DAG suitable for use with various aspects.

FIG. 5 illustrates an exemplary grammar 500 and input DAG 550 related to an input code suitable for use with various aspects. The example grammar 500 of FIG. 5 includes numerous rules 504-514 which may be matched to the various patterns and nodes of the input DAG 550. The template item 502 may show the structure of rules within the grammar 500. The first rule 504 (i.e., "[r0]" rule) may be associated with a node or combination of nodes that is represented by the DAG pattern "S," the second rule 506 (i.e., "[r1]" rule) may be associated with a node or combination of nodes that is represented by the DAG pattern "A," the third rule 508 (i.e., "[r2]" rule) may be associated with a node or combination of nodes that is represented by the DAG pattern "B," the fourth rule 510 (i.e., "[r3]" rule) may be associated with a node or combination of nodes that is represented by the DAG pattern "C," and the fifth rule 512 (i.e., "[r4]" rule) may be associated with a node or combination of nodes that is represented by the DAG pattern "D." The DAG patterns associated with the rules 504-512 may represent various node types and/or operations (e.g., integer, register, 'load', 'store', 'add', etc.). Additionally, the rules 506-512 may each have a first cost, and the rule 504 may have a second cost.

However, the sixth rule 514 (i.e., "[r']" rule) may be associated with a DAG pattern that is a combination of the DAG patterns for the rules 506-512 (e.g., a combination of the DAG patterns "A," "B," "C," and "D"). For example, the sixth rule 514 may correspond to a particular code loop (e.g., 'loop_a'). Although the sixth rule 514 includes all of these DAG patterns, the cost for the sixth rule 514 may be very low (i.e., lower than the combination of the costs associated with the individual rules for "A," "B," "C," and "D"). This may be the case when an auxiliary processor performs a certain combination of operations particularly well and thus a great benefit is received when input code includes the combination.

The input DAG 550 shows annotations that indicate the best rules matched to the DAG elements. In particular, when a computing device executes an aspect method as described above with reference to FIG. 1, 2, or 4, nodes 552, 562, and 564 may each be matched to the first rule 504 (i.e., "[r0]"). However, the nodes 554, 556, 558, and 560 may collectively be matched to sixth rule 514 (i.e., "[r']"). In other words, although individually the nodes 554-560 may be matched to the rules 506-512 for a certain cumulative cost, the computing device may identify that the nodes 554-560 may be combined to match the pattern of the sixth rule 514 for a lower cost (or higher benefit). For non-limiting illustration purposes based on the arbitrary cost values of FIG. 5, the costs for the first rule 504 associated with the nodes 552, 562, and 564 may be combined with the cost for the sixth rule 514 to find a total cost of ten (10) for the input DAG 550.

Figure 6:
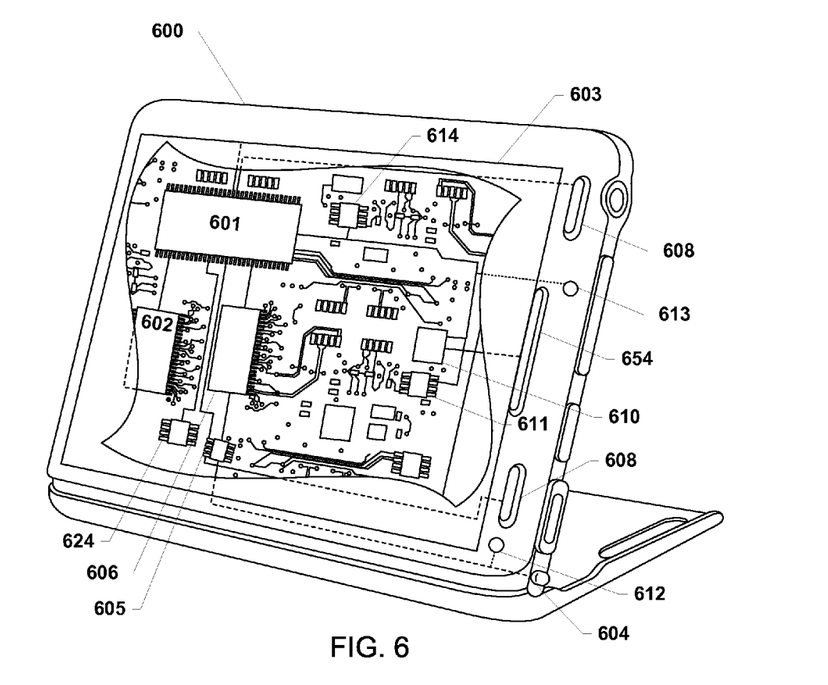
FIG. 6 is a component block diagram of a smartphone-style mobile computing device suitable for use with various aspects.

FIG. 6 is a system block diagram of a smartphone-type mobile computing device 600 suitable for use with various aspects. The smartphone mobile computing device 600 may include a processor 601 coupled to internal memory 602, a display 603, and to a speaker 654. The smartphone mobile computing device 600 may further include an auxiliary processor, such as a digital signal processor or DSP 606. In various aspects, the DSP 606 and the processor 601 may be connected, such as via an internal bus or as part of a system-on-chip design. Additionally, the smartphone mobile computing device 600 may include an antenna 604 for sending and receiving electromagnetic radiation that may be connected to a wireless data link and/or long-range wireless signal transceiver 605, such as a cellular network or WiFi radio, coupled to the processor 601 and capable of communicating over a wide area wireless communication network. In an aspect, the antenna 604 may also be coupled to the DSP 606. Smartphone mobile computing devices 600 may include a separate short-range radio transceiver 624 capable of communicating or pairing with other mobile computing devices. Smartphone mobile computing devices 600 typically may also include menu selection buttons or rocker switches 608 for receiving user inputs. Additionally, the smartphone mobile computing device 600 may include an accelerometer 610, a gyroscope 611, and a GPS receiver chip 614 coupled to the processor 601 and/or the DSP 606. In an aspect, the smartphone mobile computing device 600 may also include a microphone 612 and a camera 613 coupled to the processor 601 and/or the DSP 606. In another aspect, the smartphone mobile computing device 600 may also include other auxiliary processors, such as a graphics processing unit (not shown).

The processors 601 and 606 may be any programmable microprocessor, microcomputer or multiple processor chip or chips that can be configured by software instructions (applications) to perform a variety of functions, including the functions of the various aspects described above. In the various devices, the processors 601 and 606 may be dedicated to particular instructions, software, commands, or other uses. For example, one processor may be dedicated to wireless communication functions and one processor may be dedicated to running other applications. Typically, software applications may be stored in the internal memory 602 before they are accessed and loaded into the processors 601 and 606. The processors 601 and 606 may include internal memory sufficient to store the application software instructions. In many devices the internal memory may be a volatile or nonvolatile memory, such as flash memory, or a mixture of both. For the purposes of this description, a general reference to memory refers to memory accessible by the processors 601 and 606 including internal memory or removable memory plugged into the various devices and memory within the processors 601 and 606.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The operations of a method or algorithm disclosed herein may be embodied in a processor-executable software module (or processor-executable instructions or processor-executable software instructions) that may be stored on a non-transitory processor-readable or computer-readable storage medium. Non-transitory processor-readable storage media may be any available, non-transitory media that may be accessed by a computer or processor. By way of example, and not limitation, non-transitory computer-readable and processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable and processor-readable media. Additionally, the operations of a method or algorithm may reside as one or any combination or set of codes and/or instructions on a tangible, non-transitory machine readable medium and/or computer-readable medium that may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for a multi-core computing device to offload portions of an input code from a first processor for execution on an auxiliary processor when the portions are automatically determined to be well-suited for the auxiliary processor, comprising:
   generating a graph-based intermediate representation of the input code, wherein the graph-based intermediate representation of the input code contains directed acyclic graphs (DAGs);
   comparing each node or combination of nodes to one or more patterns in a predefined grammar, wherein each pattern is a DAG pattern and is associated with a cost metric;
   identifying a set of patterns that partially cover the graph-based intermediate representation of the input code based on the comparisons of each node or the combination of nodes to the one or more patterns in the predefined grammar; and
   offloading from the first processor to the auxiliary processor segments of the input code associated with a combination of grammar patterns of the identified set of patterns having a cumulative effect that is better than cumulative effects of other combinations of the identified set of patterns and that is within a predefined cost threshold for the auxiliary processor, wherein the one or more patterns in the predefined grammar are known to be well suited for the auxiliary processor.

2. The method of claim 1, wherein comparing each node or combination of nodes to one or more patterns in a predefined grammar comprises comparing each node or the combination of nodes to pattern information stored in a heuristic table.

3. The method of claim 1, wherein the computing device is a device that includes a system-on-chip.

4. The method of claim 1, wherein the auxiliary processor is one of a digital signal processor (DSP) and a graphics processing unit (GPU).

5. The method of claim 1, wherein a best cumulative effect is one of a lowest cumulative cost and a highest cumulative benefit.

6. The method of claim 1, further comprising generating information for presentation to a developer that indicates segments of the input code that can be configured for the auxiliary processor based on the comparisons of each node or the combination of nodes to the one or more patterns in the predefined grammar.

7. A multi-core computing device, comprising:
   means for generating a graph-based intermediate representation of an input code, wherein the graph-based intermediate representation of the input code is a directed acyclic graph (DAG);
   means for comparing each node or combination of nodes to one or more patterns in a predefined grammar, wherein each pattern is a DAG pattern and is associated with a cost metric;
   means for identifying a set of patterns that completely cover the graph-based intermediate representation of the input code based on the comparisons of each node or the combination of nodes to the one or more patterns in the predefined grammar; and means for offloading from a first processor to an auxiliary processor segments of the input code associated with a combination of grammar patterns of the identified set of patterns having a cumulative effect that is better than cumulative effects of other combinations of the identified set of patterns and that is within a predefined cost threshold for the auxiliary processor, wherein the one or more patterns in the predefined grammar are known to be well suited for the auxiliary processor.

8. The multi-core computing device of claim 7, wherein means for comparing each node or combination of nodes to one or more patterns in a predefined grammar comprises means for comparing each node or the combination of nodes to pattern information stored in a heuristic table.

9. The multi-core computing device of claim 7, wherein the computing device comprises a system-on-chip.

10. The multi-core computing device of claim 7, wherein the auxiliary processor is one of a digital signal processor (DSP) and a graphics processing unit (GPU).

11. The multi-core computing device of claim 7, wherein a best cumulative effect is one of a lowest cumulative cost and a highest cumulative benefit.

12. The multi-core computing device of claim 7, further comprising means for generating information for presentation to a developer that indicates segments of the input code that can be configured for the auxiliary processor based on the comparisons of each node or the combination of nodes to the one or more patterns in the predefined grammar.

13. A multi-core computing device, comprising:
a first processor; and
an auxiliary processor,
wherein the first processor is coupled to the auxiliary processor and configured with processor-executable instructions to perform operations comprising:
generating a graph-based intermediate representation of an input code, wherein the graph-based intermediate representation of the input code is a directed acyclic graph (DAG);
comparing each node or combination of nodes to one or more patterns in a predefined grammar, wherein each pattern is a DAG pattern and is associated with a cost metric;
identifying a set of patterns that completely cover the graph-based intermediate representation of the input code based on the comparisons of each node or the combination of nodes to the one or more patterns in the predefined grammar; and
offloading from the first processor to the auxiliary processor segments of the input code associated with a combination of grammar patterns of the identified set of patterns having a cumulative effect that is better than cumulative effects of other combinations of the identified set of patterns and that is within a predefined cost threshold for the auxiliary processor, wherein the one or more patterns in the predefined grammar are known to be well suited for the auxiliary processor.

14. The multi-core computing device of claim 13, wherein the first processor is configured with processor-executable instructions to perform operations such that comparing each node or combination of nodes to one or more patterns in a predefined grammar comprises comparing each node or the combination of nodes to pattern information stored in a heuristic table.

15. The multi-core computing device of claim 13, wherein the computing device comprises a system-on-chip.

16. The multi-core computing device of claim 13, wherein the auxiliary processor is one of a digital signal processor (DSP) and a graphics processing unit (GPU).

17. The multi-core computing device of claim 13, wherein a best cumulative effect is one of a lowest cumulative cost and a highest cumulative benefit.

18. The multi-core computing device of claim 13, wherein the first processor is configured with processor-executable instructions to perform operations further comprising generating information for presentation to a developer that indicates segments of the input code that can be configured for the auxiliary processor based on the comparisons of each node or the combination of nodes to the one or more patterns in the predefined grammar.

19. A non-transitory processor-readable storage medium having stored thereon processor-executable software instructions configured to cause a processor of a multi-core computing device to perform operations for offloading portions of an input code from a first processor to an auxiliary processor comprising:
generating a graph-based intermediate representation of the input code, wherein the graph-based intermediate representation of the input code is a directed acyclic graph (DAG);
comparing each node or combination of nodes to one or more patterns in a predefined grammar, wherein each pattern is a DAG pattern and is associated with a cost metric;
identifying a set of patterns that completely cover the graph-based intermediate representation of the input code based on the comparisons of each node or the combination of nodes to the one or more patterns in the predefined grammar; and
offloading from the first processor to the auxiliary processor segments of the input code associated with a combination of grammar patterns of the identified set of patterns having a cumulative effect that is better than cumulative effects of other combinations of the identified set of patterns and that is within a predefined cost threshold for the auxiliary processor, wherein the one or more patterns in the predefined grammar are known to be well suited for the auxiliary processor.

20. The non-transitory processor-readable storage medium of claim 19, wherein the stored processor-executable software instructions are configured to cause the processor to perform operations such that comparing each node or combination of nodes to one or more patterns in a predefined grammar comprises comparing each node or the combination of nodes to pattern information stored in a heuristic table.

21. The non-transitory processor-readable storage medium of claim 19, wherein the stored processor-executable software instructions are configured to be executed on a computing device that comprises a system-on-chip.

22. The non-transitory processor-readable storage medium of claim 19, wherein the auxiliary processor is one of a digital signal processor (DSP) and a graphics processing unit (GPU).

23. The non-transitory processor-readable storage medium of claim 19, wherein a best cumulative effect is one of a lowest cumulative cost and a highest cumulative benefit.

24. The non-transitory processor-readable storage medium of claim 19, wherein the stored processor-executable software instructions are configured to cause the processor to perform operations further comprising generating information for presentation to a developer that indicates segments of the input code that can be configured for the auxiliary processor based on the comparisons of each node or the combination of nodes to the one or more patterns in the predefined grammar.

* * * * *